(12) United States Patent
Uchiyama et al.

(10) Patent No.: US 8,109,808 B2
(45) Date of Patent: Feb. 7, 2012

(54) METHOD OF SURFACE-FINISHING GLASS SUBSTRATE FOR MAGNETIC DISKS AND GLASS SUBSTRATE FOR MAGNETIC DISKS

(75) Inventors: Yoshio Uchiyama, Tokyo (JP); Hiroshi Doi, Yamaguchi (JP); Gen Ishida, Yamaguchi (JP)

(73) Assignee: Toyo Kohan Co., Ltd., Tokyo (JP)

( * ) Notice: Subject to any disclaimer, the term of this patent is extended or adjusted under 35 U.S.C. 154(b) by 440 days.

(21) Appl. No.: 12/087,050

(22) PCT Filed: Mar. 24, 2008

(86) PCT No.: PCT/JP2008/055406
§ 371 (c)(1),
(2), (4) Date: Jun. 25, 2008

(87) PCT Pub. No.: WO2008/146522
PCT Pub. Date: Dec. 4, 2008

(65) Prior Publication Data
US 2010/0266874 A1     Oct. 21, 2010

(30) Foreign Application Priority Data
May 30, 2007   (JP) ................ 2007-143786

(51) Int. Cl.
*G11B 5/84*    (2006.01)
*B24B 1/00*    (2006.01)
*C03C 15/02*   (2006.01)
*G11B 5/71*    (2006.01)

(52) U.S. Cl. .......... 451/44; 451/63; 65/55; 216/22; 216/52; 428/848.8

(58) Field of Classification Search ........... 65/404, 65/112, 31, 35, 36, 56, 55, 30.14; 360/69, 360/135, 98.08, 351; 438/692, 3; 428/848, 428/848.8, 848.2, 846.9, 846.1; 451/35, 451/36, 41, 43, 44, 63; 216/22, 52, 51
See application file for complete search history.

(56) References Cited

U.S. PATENT DOCUMENTS
7,070,481 B1 *   7/2006   Miyamoto ............ 451/44
(Continued)

FOREIGN PATENT DOCUMENTS
JP    7-230621    8/1995
(Continued)

OTHER PUBLICATIONS
Pannii et al translation (machine) JP 2007-102842 (Apr. 2007).*
(Continued)

*Primary Examiner* — Kevin M. Bernatz
*Assistant Examiner* — Louis Falasco
(74) *Attorney, Agent, or Firm* — Wenderoth, Lind & Ponack, L.L.P.

(57) ABSTRACT

An inner peripheral edge of a toroidal glass substrate for a magnetic disk is subjected to mechanical polishing in such a manner that the surface roughness is no greater than 9 nm in terms of Rmax. Then, the inner peripheral edge is subjected to chemical polishing to remove at least 2 μm of a surface layer. The inner peripheral edge has a non-conventional mirror-finished surface obtained by mechanical polishing. Thus, sufficient ring strength is obtained even when the chemical polishing depth is smaller than in the past. A polishing depth of less than 5 μm is sufficient.

4 Claims, 4 Drawing Sheets

U.S. PATENT DOCUMENTS

| | | | |
|---|---|---|---|
| 2001/0055935 A1* | 12/2001 | Miyamoto | 451/35 |
| 2002/0061603 A1* | 5/2002 | Eto | 438/3 |
| 2003/0017296 A1* | 1/2003 | Kaneko | 428/66.6 |
| 2005/0204777 A1* | 9/2005 | Mori et al. | 65/112 |
| 2006/0061901 A1* | 3/2006 | Miyahara et al. | 360/69 |
| 2006/0117799 A1* | 6/2006 | Miyahara et al. | 65/404 |
| 2006/0128154 A1* | 6/2006 | Miyahara et al. | 360/98.08 |
| 2006/0266732 A1* | 11/2006 | Marumo | 216/22 |
| 2007/0039353 A1* | 2/2007 | Kamiya | 65/30.14 |
| 2007/0196699 A1* | 8/2007 | Aida | 428/846.1 |
| 2007/0251270 A1* | 11/2007 | Miyatani et al. | 65/31 |
| 2008/0020679 A1* | 1/2008 | Usui et al. | 451/36 |

FOREIGN PATENT DOCUMENTS

| | | |
|---|---|---|
| JP | 9-12333 | 1/1997 |
| JP | 9-124343 | 5/1997 |
| JP | 10-198942 | 7/1998 |
| JP | 11-120546 | 4/1999 |
| JP | 3527075 | 2/2004 |
| JP | 2005-285276 | 10/2005 |
| JP | 2006-164373 | 6/2006 |
| JP | 2007-102842 | 4/2007 |

OTHER PUBLICATIONS

International Search Report issued May 27, 2008 in International application PCT/JP2008/055406.

Japanese Office Action issued Sep. 2, 2008 in corresponding Japanese patent application 2008-521070 (with English translation).

* cited by examiner

METHOD OF SURFACE-FINISHING GLASS SUBSTRATE FOR MAGNETIC DISKS AND GLASS SUBSTRATE FOR MAGNETIC DISKS

BACKGROUND OF THE INVENTION

1. Technical Field

The present invention relates to a method of surface-finishing a glass substrate for a magnetic disk used in a hard disk drive and relates to a glass substrate for a magnetic disk.

2. Background Art

Patent Document 1 (Japanese Unexamined Patent Application Publication No. 7-230621) discloses that attention is focused on the fact that one of the factors governing the mechanical strength of a glass substrate for a magnetic disk is flaws present on the surface of the inner peripheral edge of the substrate where the maximum tensile stress will occur during the operation of the magnetic disk, and that at least the end face of the inner periphery is etched to achieve a predetermined surface roughness. The glass substrate described in Patent Document 1 has the surface of the inner peripheral edge or the outer peripheral edge such that, as measured with a three-dimensional SEM at least randomly selected four places with a reference length of 240 μm and a cut-off wavelength of Ra of 80 μm, the mean value of Ra is in the range of 1.0 to 6.0 μm and the mean value of the number of peaks is in the range of 8 to 30.

Patent Document 2 (Japanese Patent No. 3527075) discloses that a glass substrate has a predetermined surface roughness in order to prevent the generation of particles that cause thermal asperity on the glass substrate for a magnetic disk. This document is not aimed directly at an increase in the mechanical strength of the glass substrate. The glass substrate has a surface roughness Ra of less than 1 μm and an Rmax of 0.010 to 4 μm (10 to 4,000 nm) at the inner peripheral edge (chamfer and side wall).

Patent Document 2 describes "edges of the glass substrate subjected to chemical etching (chemical polishing) have satin-finished surfaces. Edge treatment, e.g., chemical etching, that has been performed in the past is not sufficient . . . (snip) . . . . Chemical etching is disadvantageously liable to lead to misalignment of the axes of the inner peripheral edge and the outer peripheral edge. Also in this point, subjecting the edges of the glass substrate to chemical etching is disadvantageous." in paragraph [0010]. That is, chemical polishing is problematic.

An example of a method of improving the mechanical strength of a glass substrate for a magnetic disk is chemical strengthening treatment. For example, chemical strengthening treatment includes immersing a glass substrate in a molten salt bath mainly containing a potassium nitrate salt heated at a high temperature such as about 400° C. to 500° C. for about 0.5 to 12 hours to perform ion exchange between Na ions in the surface layer of the glass substrate and K ions in the potassium nitrate. In other words, Na ions having a small ionic radius in glass are replaced with K ions having a large ionic radius, thereby resulting in compressive stress being applied to the uppermost layer to reinforce the substrate. A magnetic film for magnetic recording is formed on a main surface of the glass substrate for the magnetic disk. The magnetic film is disadvantageously corroded by K ions concentrated in the surface layer of the glass substrate by chemical strengthening treatment. Furthermore, chemical strengthening treatment requires considerable time and cost.

[Patent Document 1] Japanese Unexamined Patent Application Publication No. 7-230621
[Patent Document 2] Japanese Patent No. 3527075

Hitherto, mechanical strength has been known to tend to increase with increasing etch depth (depth of chemical polishing). With respect to the amount etched (polishing depth of the surface layer of chemical polishing), for example, Patent Document 1 discloses that the etch depth is in the range of about 5 to 25 μm and preferably about 10 to 30 μm (paragraph [0039]). Hitherto, thus, to obtain sufficient mechanical strength, an etch depth of 10 μm or more has been necessary.

An etch depth of 10 μm or more disadvantageously reduces finished dimensional accuracy, thus causing nonuniformity in roundness. Hence, the etch depth is preferably less than 5 μm. An etch depth of less than 5 μm eliminates the problems of the decrease in finished dimensional accuracy and the nonuniformity in roundness due to etching.

SUMMARY OF THE INVENTION

It is an object of the present invention to produce a glass substrate having sufficient mechanical strength (ring strength: 10 kgf or more) at a small etch depth without chemical strengthening treatment that adversely affects a magnetic film and increases cost.

It is another object of the present invention to produce a glass substrate having the minimum required mechanical strength (ring strength: 5 kgf) or more without chemical strengthening treatment or chemical polishing.

The present invention relates to a method of surface-finishing a glass substrate for a magnetic disk, the method including subjecting an inner peripheral edge of a toroidal glass substrate for a magnetic disk to mechanical polishing in such a manner that the surface roughness is 9 nm or less in terms of Rmax, and then subjecting the inner peripheral edge to chemical polishing to remove 2 μm or more of a surface layer.

The inner peripheral edge of the glass substrate has a nonconventional mirror-finished surface obtained by mechanical polishing as the first step. It was found that such a mirror-finished surface resulted in sufficiently practical ring strength even when the polishing depth of chemical polishing as the second step was smaller than in the past. In the case where the polishing depth of chemical polishing is less than 2 μm, sufficient mechanical strength (ring strength: 10 kgf or more) may not be obtained.

The present invention relates to a method of surface-finishing a glass substrate for a magnetic disk, the method including subjecting an inner peripheral edge and an outer peripheral edge of a toroidal glass substrate for a magnetic disk to mechanical polishing in such a manner that the surface roughness is 9 nm or less in terms of Rmax, and then subjecting the inner peripheral edge and the outer peripheral edge to chemical polishing to remove 2 μm or more of a surface layer of each of the edges.

The outer peripheral edge of the glass substrate is surface-finished in the same way as the inner peripheral edge, so that the outer peripheral edge also has sufficient mechanical strength. Thus, even when an impact is made on the outer periphery due to, for example, dropping or the collision of a magnetic head, the glass substrate is not easily broken. Furthermore, particles are not easily generated.

The present invention relates to the method of surface-finishing a glass substrate for a magnetic disk as described above, in which the polishing depth of the surface layer of chemical polishing is less than 5 μm.

Since the surface roughness is set at 9 nm or less in terms of Rmax obtained by chemical polishing, sufficient mechanical strength (ring strength: 10 kgf or more) is achieved even when the polishing depth of the surface layer of chemical polishing is less than 5 μm. A polishing depth of less than 5 μm of the surface layer of chemical polishing prevents a reduction in finished dimensional accuracy and nonuniformity in roundness.

The present invention is a toroidal glass substrate for a magnetic disk, the substrate having an inner peripheral edge with a surface roughness of 9 nm or less in terms of Rmax.

The inner peripheral edge of the glass substrate has a non-conventional mirror-finished surface, thus reducing microcracks that cause a decrease in mechanical strength. This results in the glass substrate having the minimum required mechanical strength (ring strength: 5 kgf) or more without chemical polishing. The glass substrate subjected to chemical polishing has sufficient mechanical strength (ring strength: 10 kgf or more).

Furthermore, the inner peripheral edge has a non-conventional mirror-finished surface, reducing the generation of particles.

The present invention relates to a toroidal glass substrate for a magnetic disk, the substrate including an inner peripheral edge and an outer peripheral edge, in which the surface roughness of each of the inner peripheral edge and the outer peripheral edge is 9 nm or less in terms of Rmax. The outer peripheral edge of the glass substrate is surface-finished in the same way as the inner peripheral edge, so that the outer peripheral edge also has increased mechanical strength. Thus, even when an impact is made on the outer periphery, the glass substrate is not easily broken. The glass substrate subjected to chemical polishing has the outer periphery having larger mechanical strength.

Furthermore, each of the inner peripheral edge and the outer peripheral edge has a non-conventional mirror-finished surface, further reducing the generation of particles.

With respect to Rmax in the present invention, the maximum height (height from the bottom of the deepest valley to the top of the highest peak) is measured in a measurement field (5 μm×5 μm square) with a tapping-mode atomic force microscope (hereinafter, referred to as an "AFM") in order to ensure an accuracy of 1 nm. The measurement is performed at least at four randomly selected places. Among the resulting maximum height values, the largest value is defined as Rmax.

In the inventions discussed above, since the inner peripheral edge of the glass substrate has a non-conventional mirror-finished surface obtained by mechanical polishing, sufficient mechanical strength is achieved even when the chemical polishing depth is reduced to 2 μm.

A small polishing depth of chemical polishing maintains dimension accuracy and roundness and significantly reduces time and cost required for chemical polishing.

In the inventions discussed above, the inner peripheral edge of the glass substrate has a non-conventional mirror-finished surface, thus reducing microcracks that cause a decrease in mechanical strength. This results in the glass substrate having the minimum required mechanical strength or more without chemical polishing. The glass substrate subjected to chemical polishing has sufficient mechanical strength (ring strength: 10 kgf or more).

Furthermore, the reduction of the generation of particles results in reliable writing and reading of information.

DETAILED DESCRIPTION OF THE INVENTION

Figure 1:
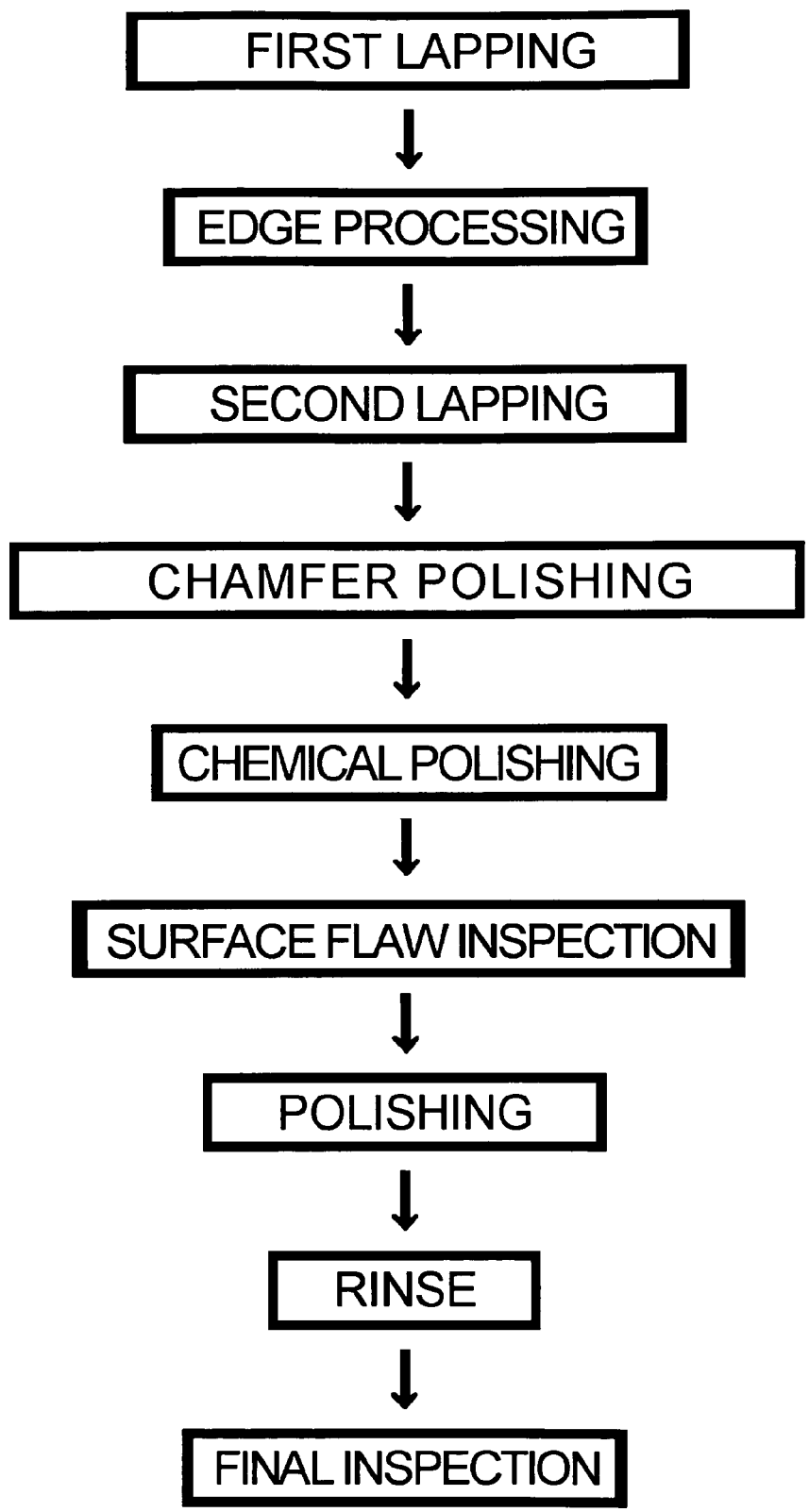
FIG. 1 is a diagram illustrating the steps of polishing and finishing a glass substrate.

Outlines of steps in a polishing method according to an embodiment of the present invention will be described below with reference to FIG. 1.

In "first lapping" and "edge processing", a glass plate is processed into a circular blank, and then a circular hole is made in the middle portion to form a toroidal glass substrate.

Figure 2:
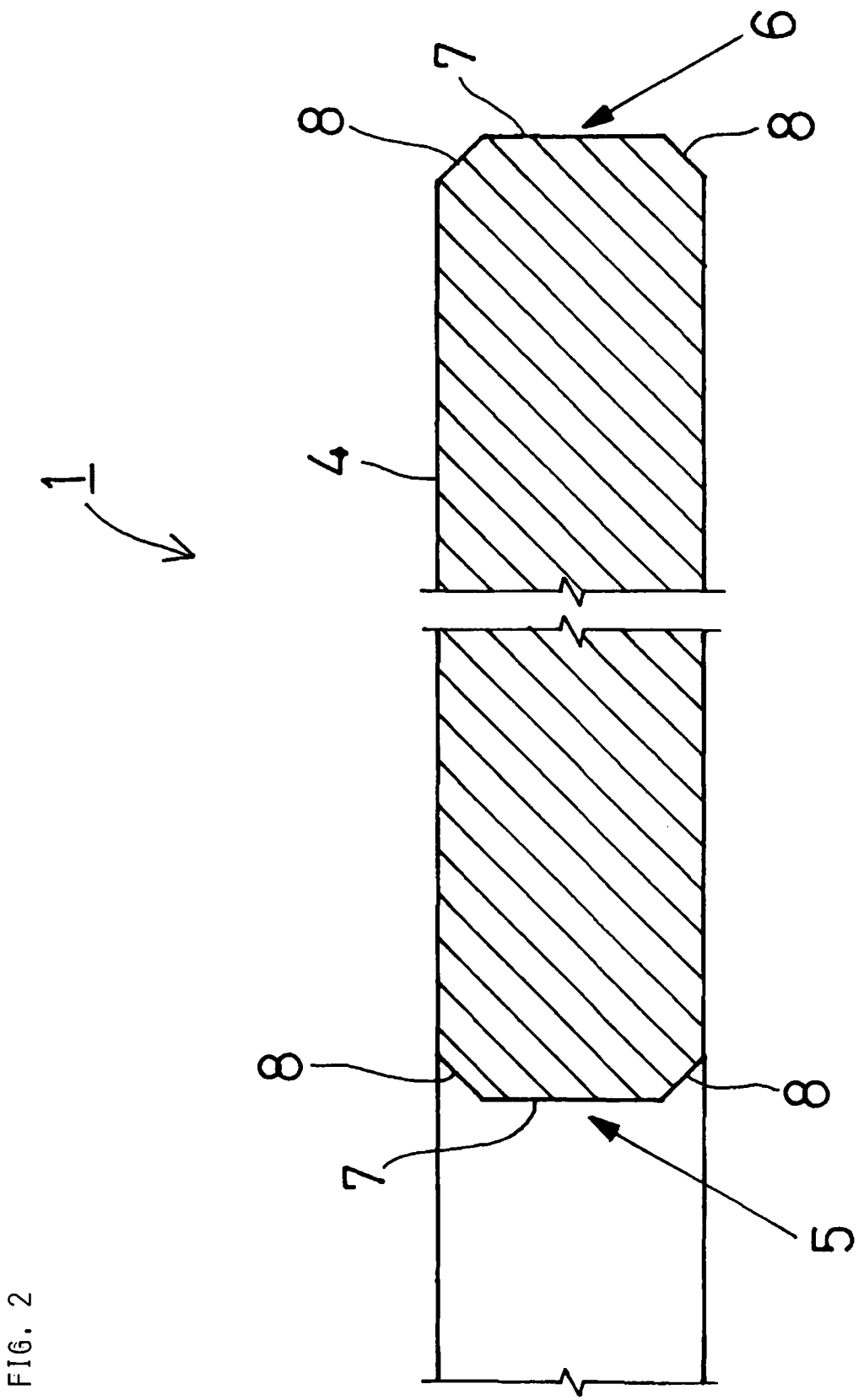
FIG. 2 is a schematic cross-sectional view of a glass substrate.

In "second lapping", a main surface 4 (data surface, FIG. 2), which is a planar portion of the glass substrate, is subjected to mechanical polishing. Mechanical polishing of the main surface is performed by lapping to achieve a predetermined dimension having polishing allowance for precision polishing (polishing).

In "chamfer polishing", an inner peripheral edge 5 (FIG. 2) and an outer peripheral edge 6 (FIG. 2) of the toroidal glass substrate are subjected to mechanical polishing. The inner peripheral edge 5 represents a side wall 7 of the inner periphery of the toroidal glass substrate. When chamfers are formed, the inner peripheral edge 5 also includes the chamfers. The outer peripheral edge 6 represents a side wall 7 of the outer periphery of the toroidal glass substrate. When chamfers are formed, the outer peripheral edge 6 also includes the chamfers.

A method of mechanical polishing includes bringing an abrasive pad formed of, for example, a soft or hard abrasive unwoven cloth into contact with the substrate while the pad is rotated or slid, using an abrasive dispersion constituted by a free abrasive dispersed in a liquid such as an aqueous solution. Mechanical polishing is performed with free abrasive grains in such a manner that a predetermined surface roughness is obtained while the abrasive grains are changed stepwise from coarse grains to finer grains. After the completion of mechanical polishing, at least the inner peripheral edge should have a surface roughness of 9 nm or less in terms of Rmax.

In "chemical polishing", at least the inner peripheral edge of the glass substrate is subjected to chemical polishing. Chemical polishing is performed by immersing the substrate in, for example, a known polishing solution (room temperature to about 70° C.) in which 0.5 to 5 volt hydrofluoric acid and 5 to 50 vol % sulfuric acid are mixed. The polishing depth of the surface layer of chemical polishing can be easily controlled by appropriately adjusting the concentration and temperature of the polishing solution and time.

Since chemical polishing is usually performed by immersing the glass substrate in the chemical polishing solution, the entirety of the exterior surface of the glass substrate is simultaneously subjected to chemical polishing.

"Polishing" refers to final polishing of the main surface. The surface of the glass substrate is polished with a polishing dispersion constituted by a free abrasive dispersed in a liquid such as an aqueous solution. Examples of the free abrasive that can be used include abrasives composed of cerium oxide, manganese oxide, titanium oxide, silicon oxide, and diamond. In this final polishing, the glass substrate is interposed between upper and lower surface plates to which abrasive pads composed of, for example, urethane or artificial leather, are attached. The glass substrate is polished while the glass substrate is rotated. Subsequently, "rinse" and "final inspection" are performed to complete a toroidal glass substrate for a magnetic disk.

As a glass material for the glass substrate used in the present invention, typical oxide glass may be used. Examples thereof include aluminosilicate glass, soda-lime glass, soda aluminosilicate glass, aluminoborosilicate glass, borosilicate glass, and quartz glass. Examples of such glass include a glass material containing 5 to 15 mass % $Na_2O$, 0 to 10 mass % $Li_2O$, 5 to 15 mass % $Al_2O_3$, 0 to 6 mass % CaO, 10 mass % $TiO_2$, 53 to 75 mass % $SiO_2$, and 0.1 to 10 mass % Nb oxide and/or V oxide in terms of $Nb_2O_5$ or of $V_2O_5$; a glass material containing 5 to 15 mass % $Na_2O$, 0 to 10 mass % $Li_2O$, 5 to 15 mass % $Al_2O_3$, 0 to 6 mass % CaO, 2 to 10 mass % $TiO_2$, 0 to 5 mass % $ZrO_2$, 53 to 75 mass % $SiO_2$, and 0.1 to 10 mass % Nb oxide and/or V oxide in terms of $Nb_2O_5$ or of $V_2O_5$; and a glass material containing 5 to 15 mass % $Na_2O$, 0 to 10 mass % $Li_2O$, 5 to 15 mass % $Al_2O_3$, 0.5 to 6 mass % CaO, 2 to 10 mass % $TiO_2$, 0 to 5 mass % $ZrO_2$, 53 to 75 mass % $SiO_2$, 0 to 15 mass % $B_2O_3$, and 0 to 5 mass % $K_2O$. In particular, a glass material containing 5 to 15 mass % $Na_2O$, 0 to 10 mass % $Li_2O$, 5 to 15 mass $Al_2O_3$, 0.5 to 6 mass % CaO, 2 to 10 mass % $TiO_2$, 0 to 5 mass % $ZrO_2$, 53 to 75 mass % $SiO_2$, 0 to 15 mass % $B_2O_3$, and 0 to 5 mass % $K_2O$ is effectively used.

EXAMPLES

Soda-lime glass was subjected to first lapping and edge processing to form a toroidal blank having an outer diameter of about 65 mm, an inner diameter of 20 mm, and a thickness of about 0.9 mm.

In second lapping (mechanical polishing of a main surface), polishing was performed in such a manner that the surface roughness of the main surface was 1 μm or less in terms of Ra.

In chamfer polishing, an inner peripheral edge was subjected to mechanical polishing by bringing an abrasive pad formed of, for example, a soft abrasive unwoven cloth into contact with the resulting toroidal substrate while the pad is rotated or slid, using an abrasive dispersion constituted by a free abrasive of, e.g., cerium oxide, having a particle diameter of several micrometers, dispersed in a liquid such as an aqueous solution. Six samples were prepared in such a manner that the surface roughness values of the inner peripheral edges of the samples after mechanical polishing were 2.7 (nm), 5.1 (nm), 9.0 (nm), 15 (nm), 1,500 (nm), and 3,000 (nm) in terms of Rmax.

Chemical polishing was performed by immersing the samples in a chemical polishing solution, having a temperature of 40° C., of a mixture of 3 vol % hydrofluoric acid and 10 vol sulfuric acid. Polishing depths of chemical polishing were set at 1 μm, 2 μm, and 4 μm. For some samples, the polishing depths were set at 5 μm, 7.5 μm, and 10 μm.

The polishing depth of chemical polishing was adjusted by changing chemical polishing time. Some samples were not subjected to chemical polishing.

Subsequently, the main surface was subjected to finishing polishing in such a manner that the main-surface roughness was 2 nm or less in terms of Ra.

With respect to the surface roughness in the Examples and Comparative Examples, when Rmax was less than 15 nm, the surface roughness, i.e., Rmax and Ra values were measured with an AFM.

When Rmax was 15 nm or more, the surface roughness, i.e., Rmax and Ra were measured according to JIS B 0601 with a stylus profilometer.

Figure 3:
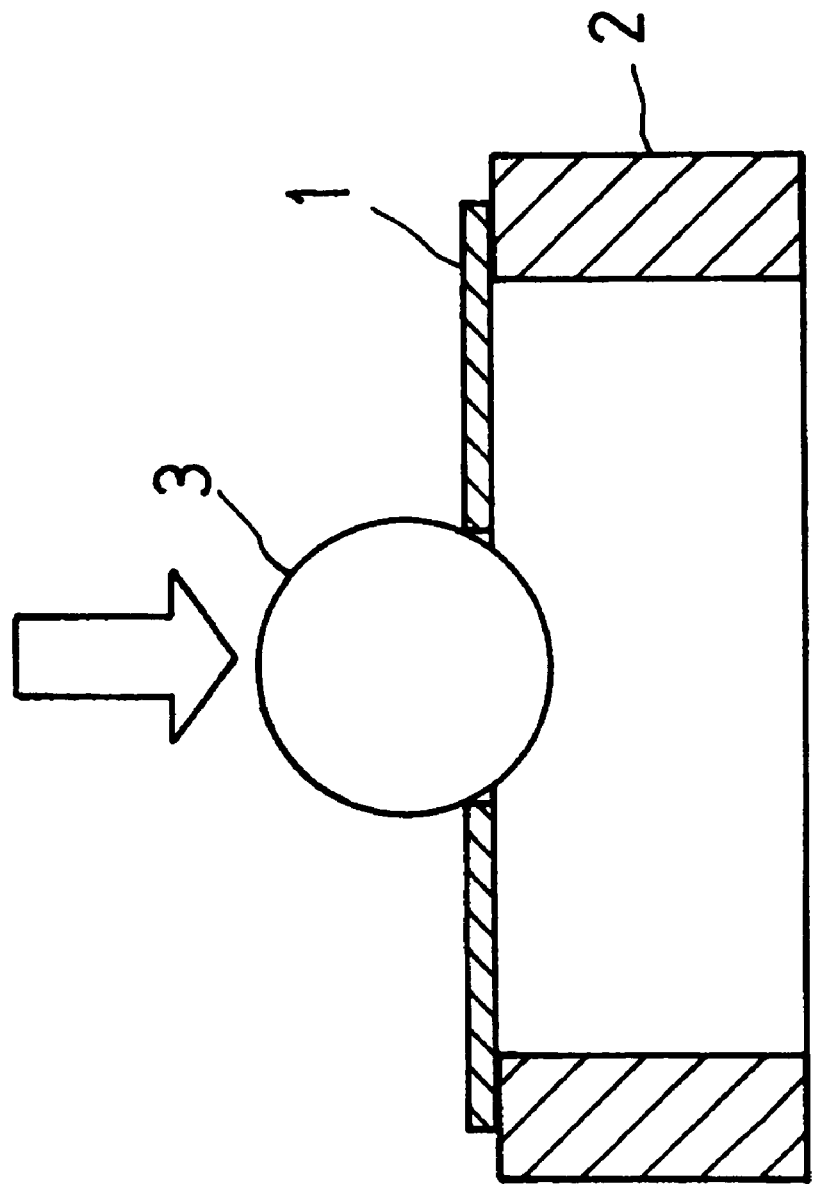
FIG. 3 is a diagram illustrating measurement of ring strength.

For the resulting samples, ring strength was measured as follows. As shown in FIG. 3, a glass substrate 1 was placed on a cylindrical stand 2 having an inner diameter of 60 mm. A hard sphere 3 having an outer diameter of 28.57 mm was placed on the inner periphery of the glass substrate 1. The ring strength was defined as a load when the glass substrate is broken by imposing a load on the hard sphere.

Figure 4:
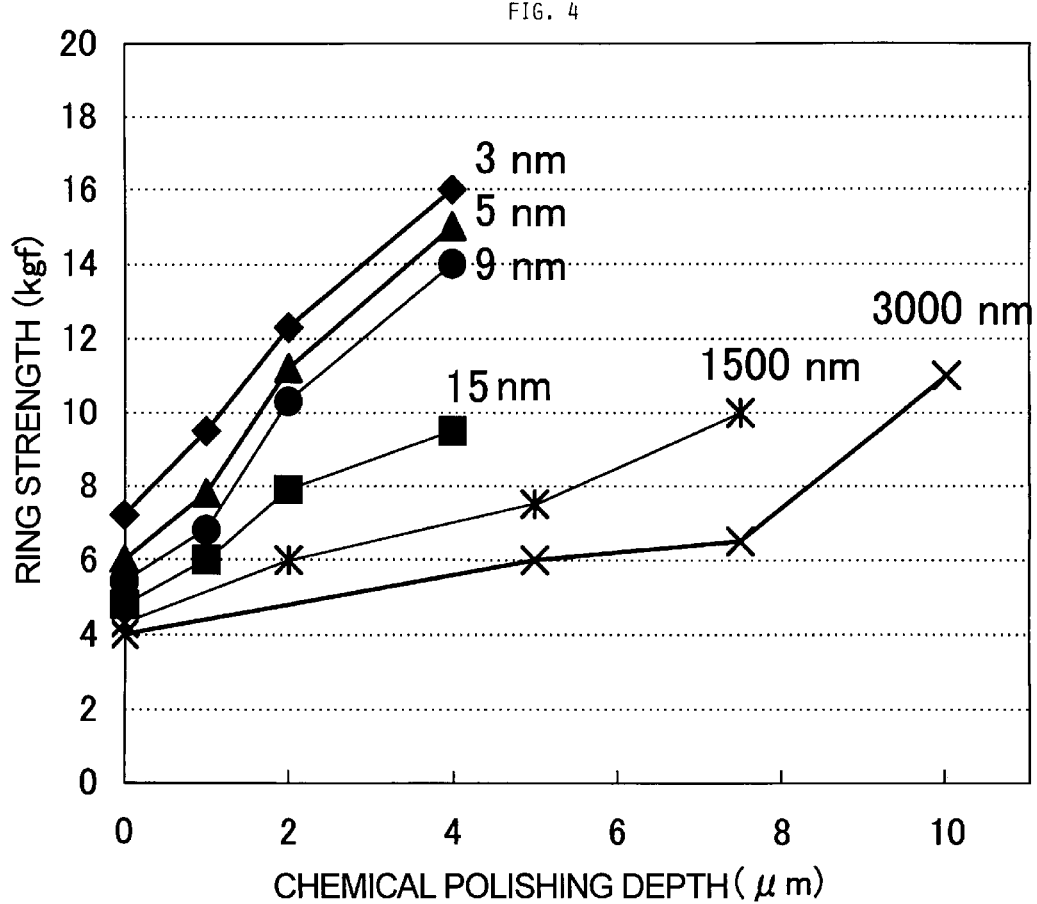
FIG. 4 is a graph illustrating the relationship between the chemical polishing depth and the ring strength.

Table 1 and FIG. 4 show the relationship among Rmax (nm) of the inner peripheral edge after mechanical polishing, the polishing depth (μm) of the inner peripheral edge of chemical polishing, Rmax (nm) of the inner peripheral edge after chemical polishing, and the ring strength (kgf) in each of the samples.

In FIG. 4, each of the numbers preceding the unit nm represents Rmax (obtained by rounding the corresponding number to the nearest whole number) of the inner peripheral edge after mechanical polishing.

TABLE 1

| Example/Comparative Example | | After mechanical polishing Rmax (nm) | Chemical polishing depth μm | After chemical polishing Rmax (nm) | Ring strength kgf |
|---|---|---|---|---|---|
| No. 1 | Example | 2.7 | Unpolished | Unpolished | 7.2 |
| No. 2 | Example | 2.7 | 1 | 2.7 | 9.5 |
| No. 3 | Example | 2.7 | 2 | 2.7 | 12.3 |
| No. 4 | Example | 2.7 | 4 | 2.7 | 16.0 |
| No. 5 | Example | 5.1 | Unpolished | Unpolished | 6.0 |
| No. 6 | Example | 5.1 | 1 | 5.1 | 7.8 |
| No. 7 | Example | 5.1 | 2 | 5.1 | 11.2 |
| No. 8 | Example | 5.1 | 4 | 5.1 | 15.0 |
| No. 9 | Example | 9.0 | Unpolished | Unpolished | 5.4 |
| No. 10 | Example | 9.0 | 1 | 9.0 | 6.8 |
| No. 11 | Example | 9.0 | 2 | 9.0 | 10.3 |
| No. 12 | Example | 9.0 | 4 | 9.0 | 14.0 |
| No. 13 | Comparative Example | 15 | Unpolished | Unpolished | 4.8 |
| No. 14 | Comparative Example | 15 | 1 | 15 | 6.0 |
| No. 15 | Comparative Example | 15 | 2 | 15 | 7.9 |
| No. 16 | Comparative Example | 15 | 4 | 15 | 9.5 |
| No. 17 | Comparative Example | 1500 | Unpolished | Unpolished | 4.3 |
| No. 18 | Comparative Example | 1500 | 2 | 1500 | 6.0 |
| No. 19 | Comparative Example | 1500 | 5 | 1500 | 7.5 |
| No. 20 | Comparative Example | 1500 | 7.5 | 1500 | 10 |
| No. 21 | Comparative Example | 3000 | Unpolished | Unpolished | 4 |
| No. 22 | Comparative Example | 3000 | 5 | 3000 | 6 |
| No. 23 | Comparative Example | 3000 | 7.5 | 3000 | 6.5 |
| No. 24 | Comparative Example | 3000 | 10 | 3000 | 11 |

As is apparent from Table 1, in the case where Rmax of the inner peripheral edge after mechanical polishing was set at 9 nm or less, the minimum required ring strength (5 kgf) or more was ensured even without chemical polishing. When chemical polishing was performed, a chemical polishing depth of 2 μm or more resulted in sufficient ring strength (10 kgf or more). A chemical polishing depth of 4 μm resulted in a sufficient ring strength of 14 kgf. Therefore, a chemical polishing depth of less than 5 μm was sufficient.

In contrast, in the case where the Rmax values of the inner peripheral edge after mechanical polishing were set at 15 nm, 1,500 nm, and 3,000 nm, the ring strength was less than the required minimum value (5 kgf) unless chemical polishing was performed. Even when chemical polishing was performed, sufficient ring strength (10 kgf or more) was not obtained unless the chemical polishing depth was set at 7.5 μm or more.

Rmax after chemical polishing did not vary compared with Rmax before chemical polishing.

| Reference Numerals | |
|---|---|
| 1 | glass substrate |
| 2 | stand |
| 3 | hard sphere |
| 4 | main surface |
| 5 | inner peripheral edge |
| 6 | outer peripheral edge |
| 7 | side wall |
| 8 | chamfer |

The invention claimed is:

1. A method of surface-finishing a glass substrate for a magnetic disk, the method comprising:
    subjecting an inner peripheral edge of a toroidal unstrengthened glass substrate having a chamfer to mechanical polishing in such a manner that the surface roughness is no greater than 9 nm in terms of Rmax, the glass substrate being for a magnetic disk; and then
    subjecting the inner peripheral edge to a chemical etch treatment using $HF+H_2SO_4$ solution to remove at least 2 μm and less than 5 μm of a surface layer such that mechanical strength after the chemical etch treatment is in a range of 10.3 kgf to 16.0 kgf.

2. The method of claim 1, wherein the glass substrate consists of one of an aluminosilicate glass substrate, a soda-lime glass substrate, a soda aluminosilicate glass substrate, an aluminoborosilicate glass substrate, a borosilicate glass substrate, and a quartz glass substrate.

3. A method of surface-finishing a glass substrate for a magnetic disk, the method comprising:
    subjecting an inner peripheral edge and an outer peripheral edge of a toroidal unstrengthened glass substrate having a chamfer to mechanical polishing in such a manner that the surface roughness is no greater than 9 nm in terms of Rmax, the glass substrate being for a magnetic disk; and then
    subjecting the inner peripheral edge and the outer peripheral edge to a chemical etch treatment using $HF+H_2SO_4$ solution to remove at least 2 μm and less than 5 μm of a surface layer of each of the edges such that mechanical strength after the chemical etch treatment is in a range of 10.3 kgf to 16.0 kgf.

4. The method of claim 3, wherein the glass substrate consists of one of an aluminosilicate glass substrate, a soda-lime glass substrate, a soda aluminosilicate glass substrate, an aluminoborosilicate glass substrate, a borosilicate glass substrate, and a quartz glass substrate.

* * * * *